(12) United States Patent
Specht (10) Patent No.: US 6,585,107 B1
(45) Date of Patent: Jul. 1, 2003

(54) DRIVE SYSTEM, ESPECIALLY FOR TRANSPORT ROLLERS

(75) Inventor: Dieter Specht, Arcegno (CH)

(73) Assignee: Interroll Holding AG (CH)

( * ) Notice: Subject to any disclaimer, the term of this patent is extended or adjusted under 35 U.S.C. 154(b) by 0 days.

(21) Appl. No.: 09/937,682

(22) PCT Filed: Mar. 21, 2000

(86) PCT No.: PCT/EP00/02496

§ 371 (c)(1),
(2), (4) Date: Jan. 23, 2002

(87) PCT Pub. No.: WO00/59810

PCT Pub. Date: Oct. 12, 2000

(51) Int. Cl.⁷ .............................................. B65G 13/07
(52) U.S. Cl. ............ 198/790; 198/781.09; 198/781.11; 198/781.03
(58) Field of Search ........................ 198/781.03, 781.09, 198/781.11, 790

(56) References Cited

U.S. PATENT DOCUMENTS

| | | | | |
|---|---|---|---|---|
| 2,493,479 A | * | 1/1950 | Eggleston | |
| 4,164,998 A | * | 8/1979 | DeGood et al. | 198/781.06 |
| 4,215,775 A | * | 8/1980 | Gebhardt et al. | 198/790 X |
| 4,221,288 A | * | 9/1980 | Rae | 198/781.03 |
| 4,311,242 A | * | 1/1982 | Hnatko | 198/790 |
| 4,993,541 A | * | 2/1991 | Roh | 198/781.02 |
| 5,076,420 A | * | 12/1991 | Kuschel | 198/781.08 |
| 5,147,024 A | * | 9/1992 | Yamada | 198/781.02 |
| 5,148,909 A | * | 9/1992 | Becker et al. | 198/780 |
| 5,209,342 A | * | 5/1993 | Vom Stein | 198/790 |
| 5,392,899 A | | 2/1995 | Wakabayashi | |
| 5,878,869 A | | 3/1999 | Wang | |

FOREIGN PATENT DOCUMENTS

| | | | |
|---|---|---|---|
| DE | 2 328 206 | 1/1974 | |
| DE | 2805 343 A1 * | 8/1979 | 198/790 |
| DE | 29 08 006 | 9/1979 | |
| DE | 31 36 597 | 3/1983 | |
| DE | 41 11 349 | 10/1992 | |
| DE | 93 16 922.1 | 3/1994 | |
| EP | 0 327 652 | 8/1989 | |
| GB | 2 253 025 A * | 8/1992 | 198/790 |

* cited by examiner

Primary Examiner—Christopher P. Ellis
Assistant Examiner—Richard Ridley
(74) Attorney, Agent, or Firm—Gerald E. Hespos; Anthony J. Casella (57) ABSTRACT

The invention relates to a drive system for transport rollers (4) in a roller path. According to the invention, said transport rollers (4) are rotated by drive means (14, 34, 52). Said drive means (14, 34, 52) are completely arranged in the interior of at least one support profile (2) carrying the transport rollers (4).

10 Claims, 5 Drawing Sheets

DRIVE SYSTEM, ESPECIALLY FOR TRANSPORT ROLLERS

DESCRIPTION

The invention relates to a drive system for conveying rollers in a roller conveyor.

Roller conveyors, which are used to convey a wide variety of objects, generally comprise two mutually parallel supporting sections that extend in the longitudinal direction of the roller conveyor and between which a multiplicity of conveying rollers is arranged in series. These conveying rollers can be supported in such a way as to rotate freely, i.e. can be undriven, with the result that the objects to be conveyed move on the roller conveyor only by virtue of an acceleration previously imparted to them or, if the roller conveyor slopes, by virtue of their weight. However, roller conveyors of this kind also involve the use of driven conveying rollers to which rotation is imparted externally in order to move an object on the roller conveyor. In this case, all the conveying rollers of a roller conveyor or only certain conveying rollers at regular intervals may be driven, with freely rotatable conveying rollers being arranged between these driven conveying rollers.

The conveying rollers generally have a socket in their two longitudinal ends or end faces for an axle or shaft, by means of which they are supported in the supporting sections of the roller conveyor. In the case of the driven conveying rollers, a drive shaft is mounted at at least one end of the driven conveying roller, this drive shaft on the one hand being supported in the supporting section and on the other hand generally having, between the conveying roller and the supporting section, a driving wheel by means of which the conveying roller is driven. These driving wheels are generally chain wheels or gearwheels, which are driven by means of a chain or a toothed belt. In this case, a continuous drive chain or a continuous toothed belt generally extends over a multiplicity of driving wheels of a multiplicity of associated conveying rollers belonging to a conveying group, and these conveying rollers are thus driven jointly.

However, this arrangement has the disadvantage that the driving wheels and the toothed belt or drive chain are very close to the actual conveying roller, and there is therefore the risk of contact with objects to be conveyed. Another disadvantage is that the drive system, which is arranged between the conveying rollers and the supporting section, quickly gets dirty, which impairs its operation and increases wear. This drive system furthermore provides poor accessibility, especially when fitting or changing an endless drive belt or a drive chain, since all the rollers have to be removed to do this.

It is the object of the invention to provide an improved drive system for conveying rollers in a roller conveyor, in which the drive system is better protected from dirt and any possible contact with objects to be conveyed and provides improved accessibility.

The object is achieved by means of a drive system with the features given in claim 1. Advantageous embodiments will become apparent from the sub-claims.

In the drive system according to the invention, the drive arrangements, which drive at least some of the conveying rollers in rotation, are arranged completely within at least one supporting section or profile supporting the conveying rollers. In this way, a fully closed drive system is formed that offers better protection for the drive system from dirt. This closed configuration furthermore reduces the risk that objects to be conveyed or people standing close to the roller conveyor will come into contact with the drive system, thereby reducing the risk of damage to the drive system and to the objects to be transported or of injuries.

The drive arrangements advantageously comprise at least one driving wheel for each driven conveying roller, which is connected in a rotationally fixed manner by a shaft to the conveying roller, at least one group of driving wheels being driven by a common driving means. A drive system of this kind allows a simple and economical drive configuration since the conveying rollers can be driven by means of the driving wheels, via belts or chains that run through, for example.

The driving wheels are furthermore preferably designed as gear-wheels, which are driven by means of a common driving means in the form of a toothed belt or a chain. A toothed-belt drive or chain drive of this kind allows reliable power transmission to the individual conveying rollers. In addition, the toothed-belt drive, in particular, can be produced economically.

The shafts are expediently supported on both sides of the associated driving wheels in at least one supporting device arranged in the supporting section. In this way, reliable support for the driving wheels and the shafts that transmit the driving torque from the driving wheels to the conveying rollers is ensured. By virtue of the direct support close to the driving wheels, the transverse forces introduced into the shaft and bending moments associated with them are reduced, better and smoother running of the conveying rollers thereby being achieved overall.

One individual supporting device is preferably provided for a certain number of driven conveying rollers or for each individual driven conveying roller. This allows very flexible adaptation of the drive system to different numbers and arrangements of driven conveying rollers since the supporting devices can be mounted at those points in the supporting section at which driven conveying rollers are provided for the desired application.

The supporting device is preferably of essentially U-shaped design, the two free legs of the supporting device extending in parallel along the faces of the associated driving wheel and having the bearings for the shaft. As a result, the supporting device can be constructed in a very compact way, making it easy to arrange within a supporting section. The bearings can furthermore be arranged very close to the driving wheel, advantageous power transmission to the bearings combined with low bending moments on the shaft thereby being achieved. In this case, especially if the conveying rollers are intended only to carry light loads, the bearings are advantageously designed as simple sliding-contact bearings, in which the shaft for driving the conveying rollers is supported.

The supporting device is advantageously secured within the supporting section, preferably by being latched in. Corresponding grooves, in which the supporting device can be engaged by means of corresponding projections, can be provided for this purpose within the supporting section, which is preferably designed as an extruded aluminum section. This allows very rapid and economical assembly since no screwing operations or other time-consuming fastening operations involving additional fastening elements are required.

The supporting device can advantageously be divided in such a way that at least one of the free legs is removable. This configuration allows extremely easy fitting of the driving means, especially when this is an endless driving means such as a toothed belt. In this case, one of the free legs of the supporting device can be removed to allow the driving means to be fitted, the driving wheel and the shaft then continuing to be held by the second leg of the supporting device. The driving means, e.g. the toothed belt, can then be pushed easily onto the driving wheel, which is now accessible, and the leg removed can then be reattached to the supporting device, re-establishing support on both sides of the driving wheel.

The removable leg of the supporting device can preferably be connected to the remaining part of the supporting device and preferably also to the supporting section by being latched in. This further simplifies assembly since no involved assembly operations, such as screwing, are required. The parts of the supporting device are simply engaged or clipped into one another and likewise secured in the supporting section by being latched in. In this arrangement, the supporting section, which is preferably an extruded aluminum section, has corresponding latching means, e.g. corresponding latching grooves.

It is advantageous if the supporting device additionally forms a guide for the driving means. For this purpose, the U-shaped supporting device is dimensioned in such a way that it rests directly with its free legs against the faces of the driving wheel, the free legs thus simultaneously forming a lateral guide for a driving means passing through, e.g. a toothed belt. In addition, the distance between the circumferential surface of the driving wheel and that part of the supporting device that connects the two free legs to one another is expediently such that a guide is likewise provided in the radial direction and it is possible to prevent the driving means from slipping or jumping off the driving wheel in the radial direction.

The driving wheels and/or the supporting devices are advantageously manufactured from plastic. This allows extremely economical manufacture and offers a variety of design options to allow adaptation of the drive system to different applications. A certain elasticity in the supporting device can furthermore be ensured, thereby simplifying the process of engagement in the supporting section.

The supporting section is expediently of open construction on one longitudinal side, preferably on the longitudinal side facing away from the conveying rollers, to enable the drive arrangements to be inserted, this area of open construction preferably being closable by means of a cover strip. This allows easy access for installing and maintaining the drive system since all the elements of the drive system can be inserted laterally into the open supporting section. It is not necessary to remove the conveying rollers for this purpose since all installation, maintenance and replacement work on the drive arrangements can advantageously be carried out from the side facing away from the conveying rollers. After insertion, the area of open construction is then closed by means of the cover strip, which is preferably constructed from plastic, with the result that the entire drive system is fully encapsulated in the supporting section without the need for additional housing components to enclose the drive system securely. Moreover, this means that the drive system is reliably protected from dirt or damage and there is no danger that people will come into contact with the drive system, whereby it is possible to minimize the risk of injury.

The invention is described below by way of example with reference to attached drawings, in which.

Figure 1:
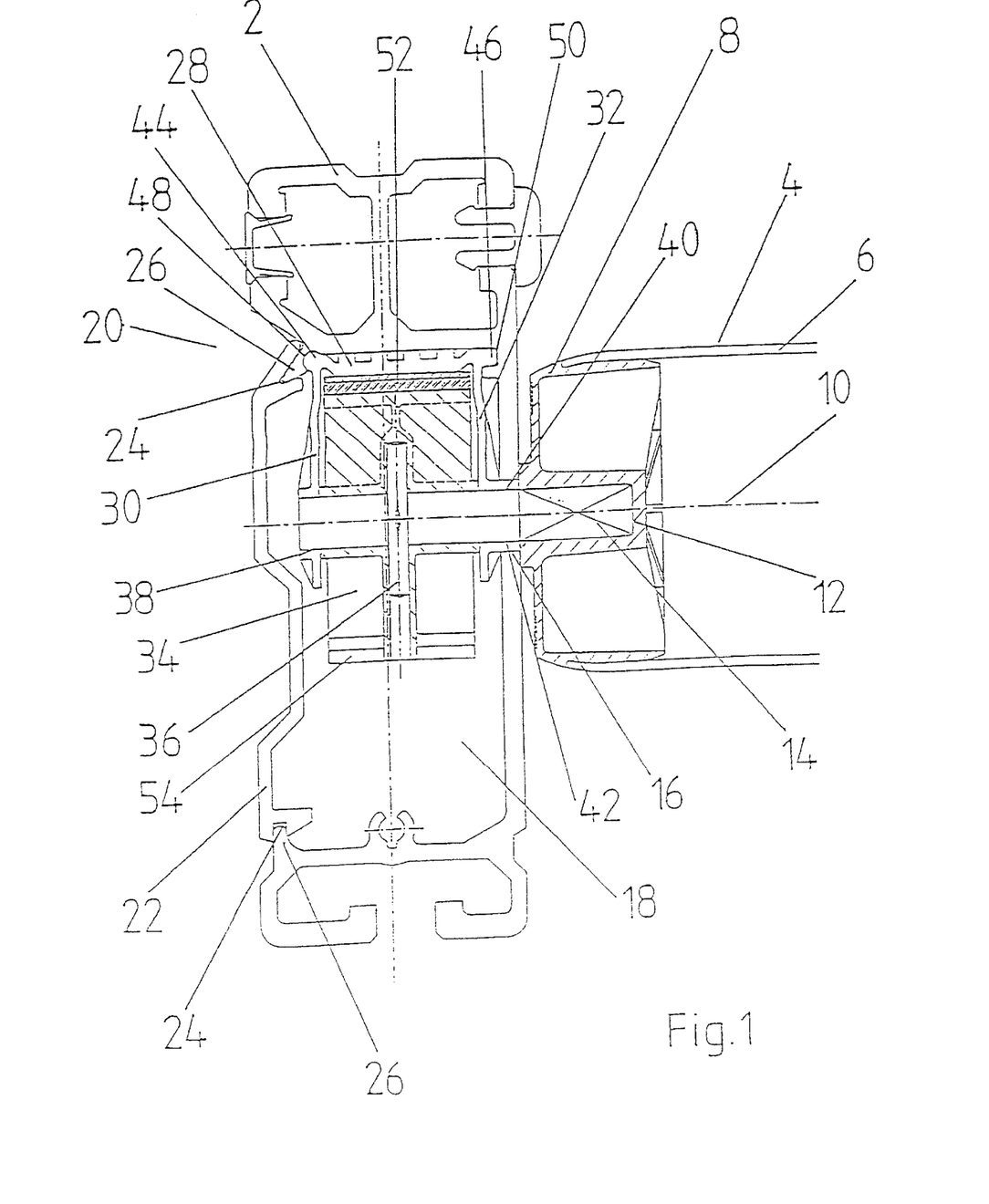
FIG. 1 shows a sectional view of a supporting section with the drive system according to the invention.

FIG. 1 shows a section through a supporting section 2 with a conveying roller 4 mounted on it, only the end of the conveying roller 4 that faces the supporting section 2 being illustrated. The conveying roller 4 comprises a cylindrical roller body 6 and a roller end piece 8 inserted at the end of the roller facing the supporting section 2. The roller body 6 is preferably composed of metal, while the roller end piece 8 is preferably manufactured from plastic, e.g. by injection molding. In the direction of the longitudinal axis 10 of the roller, the roller end piece 8 has a socket 12, into which a drive shaft 14 is inserted. The cross section of the socket 12 is that of a square, and the drive shaft 14, which is likewise constructed as a square at its end facing the conveying roller 4, thus enters into form-locking engagement with the socket 12, ensuring reliable power transmission from the drive shaft 14 to the roller end piece 8 and hence to the entire conveying roller 4.

The drive shaft 14 extends into the supporting section 2 through an opening 16 in the direction of the longitudinal axis 10 of the roller, starting from the roller end piece 8. The supporting section 2 is an extruded aluminum section with, in its interior, a cavity 18, which is open toward the longitudinal side 20 of the supporting section 2 that faces away from the conveying roller 4. The opening of the cavity 18 toward the longitudinal side 20 extends over the entire length of the supporting section 2 in the longitudinal direction of the latter. The opening of the cavity 18 is closed by a cover strip 22. The cover strip 22 is preferably constructed from plastic and has latching grooves 24 along its upper and lower edges, these extending over the entire longitudinal direction of the cover strip and entering into engagement with corresponding latching projections 26 on the supporting section 2. The latching projections 26 are designed as continuous webs that extend in the longitudinal direction of the supporting section 2. The cover strip 22 can thus be removed and refitted easily, without the need for special tools, to allow the drive arrangement to be mounted in the cavity 18. A supporting device 28 for each driven conveying roller 4 is arranged in the cavity 18. The supporting device 28 has an essentially U-shaped cross section with two free legs 30 and 32, which extend parallel to the faces of a driving wheel in the form of a gearwheel 34. The gearwheel 34 is mounted on the drive shaft 14 and the shaft thus extends completely through the gearwheel 34. The gearwheel 34 is secured on the drive shaft 14 by means of a notched pin 36, which extends through the drive shaft 14 essentially perpendicularly to the longitudinal axis 10 of the roller and thus fixes the gearwheel 34 on the drive shaft 14 and allows reliable power transmission from the gearwheel 34 to the drive shaft 14. In its two free legs 30, 32, the supporting device 28 has openings 38 and 40, through which the drive shaft 14 extends and which are designed as sliding-contact bearings, in which the shaft 14 is supported. The supporting device 28 is preferably manufactured from plastic and the sliding-contact bearings in the openings 38 and 40 are thus also in the form of simple plastic shells, in which the drive shaft 14, which is preferably manufactured from metal, is supported in a sliding manner. Extending around the opening 40 in free leg 33, parallel to the longitudinal axis 10 of the roller, essentially perpendicularly to free leg 32 and starting from the latter, is a sleeve 42, which has the opening 40 inside it and is configured on its outer circumference as a hexagon that engages in the opening 16 in the longitudinal side of the supporting section 2 that faces the conveying roller 4. The opening 16 has a corresponding hexagonal form, a secure fit thus being achieved between the opening 16 and the sleeve 42. The sleeve 42 can also have a shape different from the hexagonal outline shown here, e.g. a circular outline, the design of the opening 16 being adapted accordingly.

At its two corners or edges, at which the free legs 30, 32 are connected to the base of the U-shaped supporting device 28, the supporting device 28 has two latching projections 44, 46, which engage in associated latching grooves 48, 50 in the cavity 18 of the supporting section 2. The latching grooves 48, 50 extend continuously in the longitudinal direction of the supporting section 2 along the two upper edges of the cavity 18 and within the latter. This allows the supporting device 28 to be snapped in at any point on the supporting section 2 at which a driven conveying roller 4 is required. All that is then required is to form a matching opening 16 at the corresponding point to enable the sleeve 42 of the supporting device 28 to engage with it. The supporting device 28 is thus connected to the supporting section 2 merely by being snapped in, thereby ensuring very easy, rapid and economical installation of the drive system. The supporting device 28 is designed in such a way that a free space for the guidance of a toothed belt 52 remains between the circumferential surface of the gearwheel 14 and the base of the supporting device 28, which connects the free legs 30 and 32 to one another. The toothed belt 52 enters into engagement with toothing 54 on the circumference of the gearwheel 34 in order to drive the gearwheel 34 and hence, via the drive shaft 14, the conveying roller 4. In this arrangement, the toothed belt 52 is guided laterally between the free legs 30, 32 of the supporting device 28. Since the radial distance between the supporting device 28 and the circumferential surface of the gearwheel 14 is set to match the toothed belt 52, the belt is likewise guided on the gearwheel 34 in the radial direction by the supporting device 38, preventing it from jumping off or slipping.

On its outer surface, the supporting section 2 furthermore has a plurality of fastening grooves of the kind already known from other supporting sections, by means of which the supporting section 2 can be attached to a substructure or in which slide rails or the like can be fastened.

Figure 2:
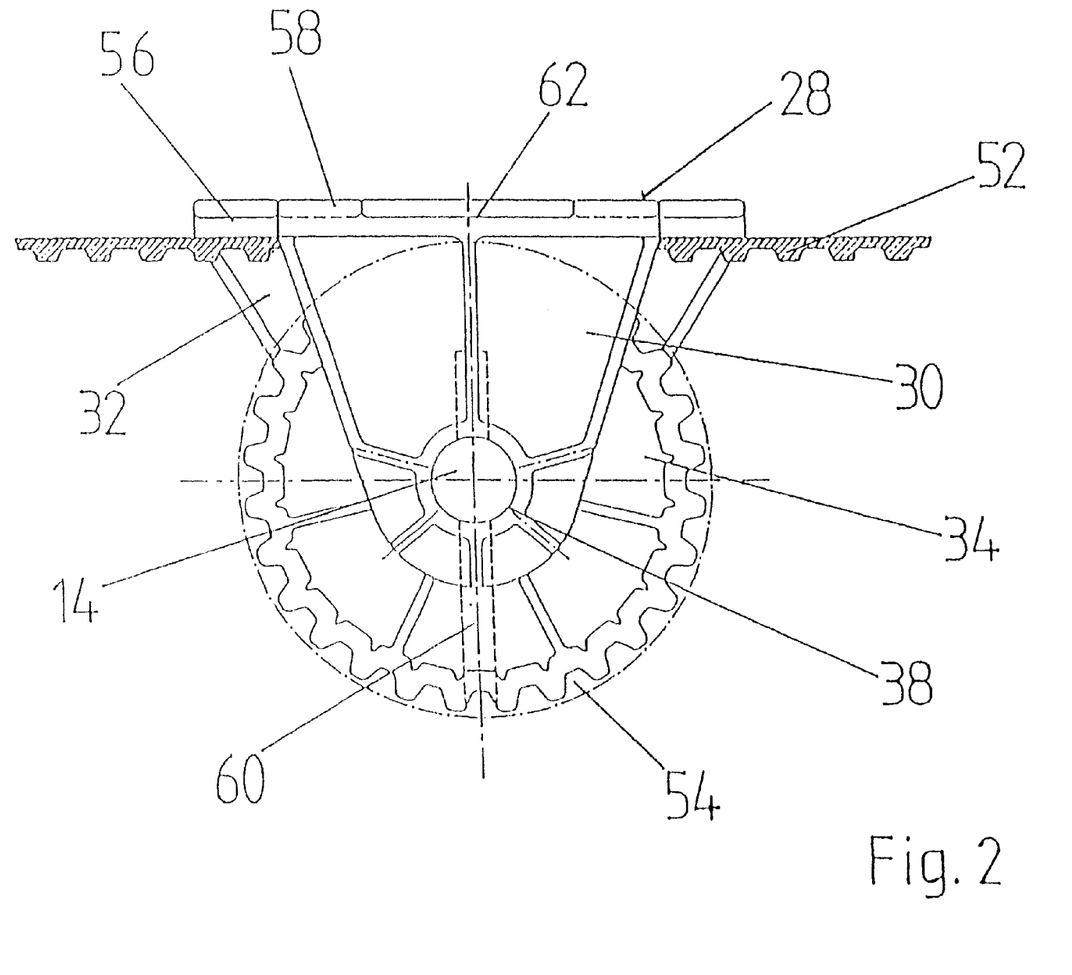
FIG. 2 shows a side view of a drive arrangement according to the invention.

FIG. 2 shows a side view of the supporting device 28. The supporting device 28 comprises two parts 56, 58, which are connected to one another, as will be described below. Each part 56, 58 carries one of the free legs 30, 32. The gearwheel 34 is arranged between the free legs 30, 32 on the drive shaft 14, which is supported in the opening 38 in free leg 30 of the supporting device 28. Formed in the gearwheel 34 is a hole 60 (illustrated in broken lines in FIG. 2), which extends through the central area of the gearwheel 34 perpendicularly to the longitudinal axis of the roller and to the drive shaft 14 in order to accommodate the notched pin 36 shown in FIG. 1 for fastening the gearwheel 34 on the drive shaft 14. On its circumferential surface, the gearwheel 34 has the toothing 54, with which the toothed belt 52 enters into engagement on the upper side of the gear-wheel 34. In this arrangement, the toothed belt 52 is guided between the base 62 of the supporting device 28 connecting the free legs 32 and 30 to one another and the circumferential surface of the gearwheel 34. In this way, the toothed belt 52 can be prevented from jumping off or slipping on the gearwheel 34. The arrangement shown in FIG. 2, with the supporting device 28, the gearwheel 34 and the drive shaft 14, forms the entire drive system for the conveying roller, which can be arranged variously in the supporting section 2 shown in FIG. 1 at positions at which driven conveying rollers are provided. The drive system thus forms an extremely compact unit that can be installed easily and can be arranged in a protected manner within the supporting section 2.

Figure 3:
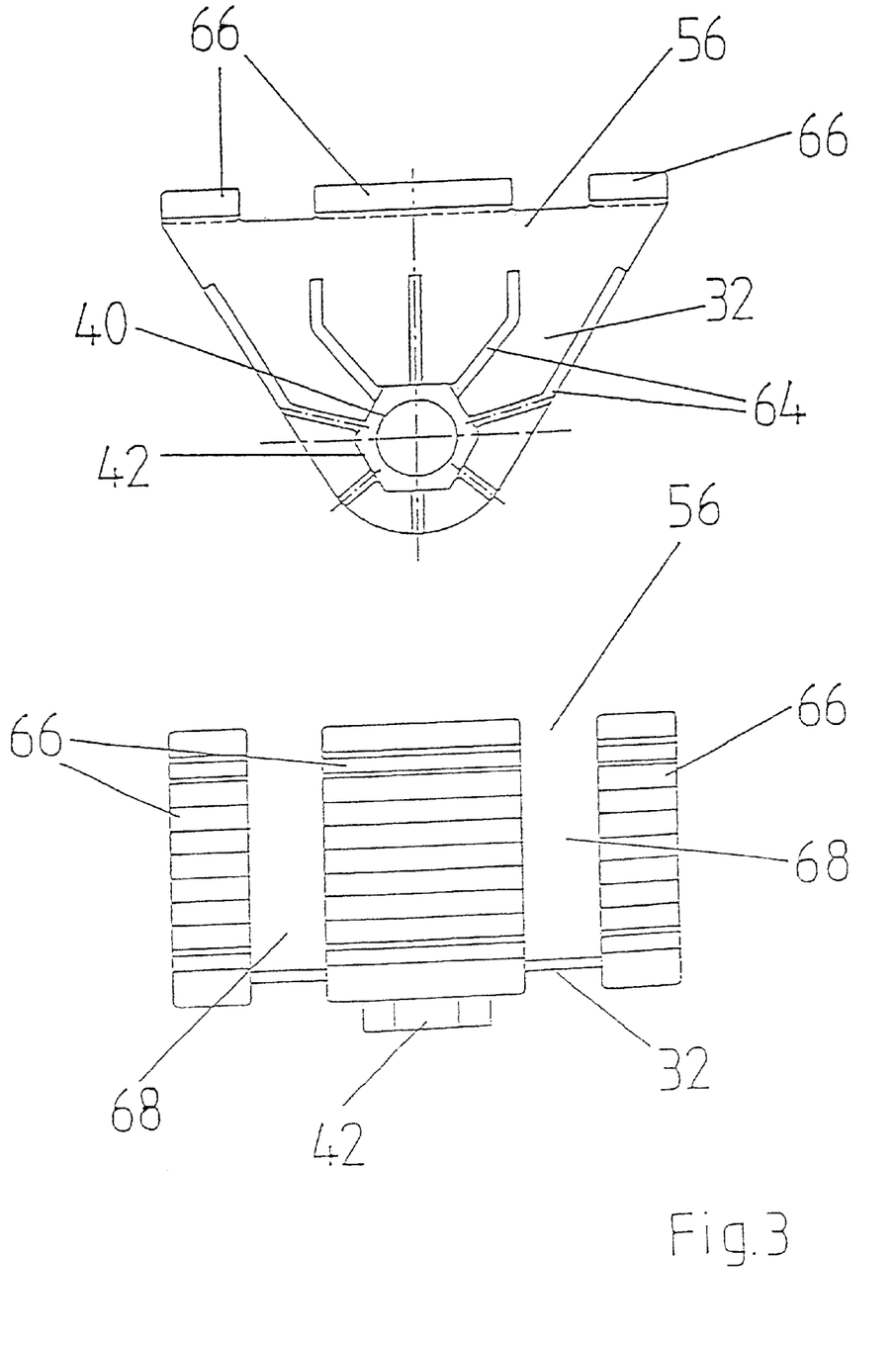
FIG. 3 shows a side view and a plan view of a first part of a supporting device.

The structure of the supporting device 28 will now be described in greater detail with reference to FIGS. 3 to 5. FIG. 3 shows a detail view of the first part 56 of the supporting device 28. A side view is shown at the top in FIG. 3 and a plan view is shown at the bottom in FIG. 3. The first part 56 of the supporting device 28 contains free leg 32, on the outside of which, i.e. the side facing the conveying roller 4 (see FIG. 1), the sleeve 42 is constructed with a hexagonal outline. The sleeve 42 has the opening 40, which serves as a bearing for the drive shaft 14. In addition, the outside of free leg 32 has formed on it reinforcing ribs 64, which fall away obliquely and connect the outer circumference of the sleeve 42 to the outer surface of free leg 32. The first part 56 has three tongues 66, which extend essentially at right angles from free leg 32 and are spaced apart by two free spaces 68. The tongues 66 start from the upper edge of free leg 32 and extend over a length that corresponds essentially to the distance between the free legs 30 and 32 in the assembled condition. The tongues 66 form part of the base 62 of the supporting device 28.

Figure 4:
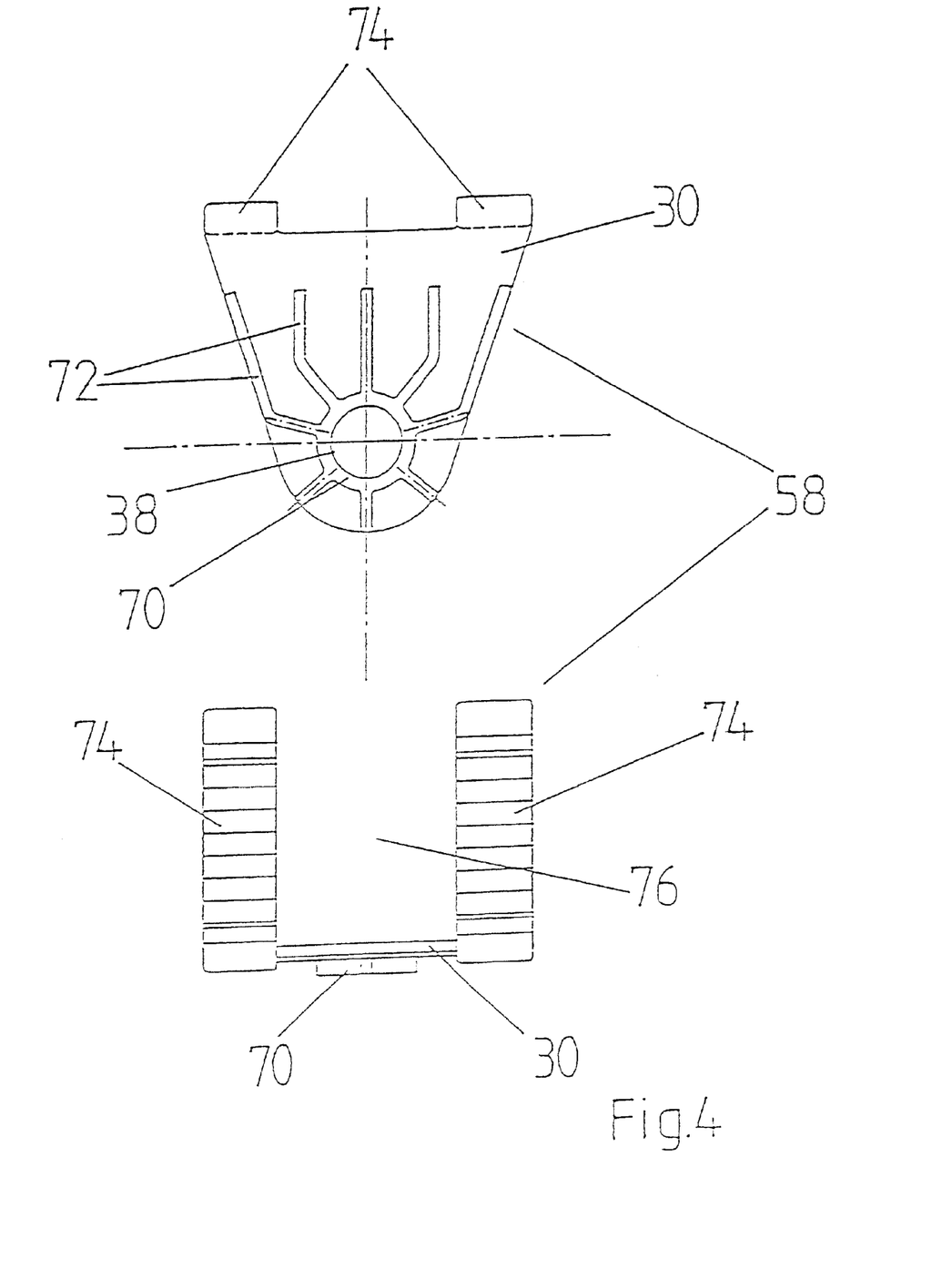
FIG. 4 shows a side view and a plan view of a second part of a supporting device.

FIG. 4 shows a detail view of the second part 58 of the supporting device 28. The second part 58 is shown in side view at the top in FIG. 4 and in plan view from above at the bottom in FIG. 4. The second part 58 carries free leg 30, in which is formed the opening 38, which serves as a second sliding-contact bearing for the drive shaft 14. Extending around the opening 38, at right angles to the outside of free leg 30, i.e. to the side facing away from the conveying roller 4, is a sleeve 70 (see FIG. 1). The sleeve 70 serves to reinforce the sliding-contact bearing, formed by the opening 38, for the drive shaft 14. Reinforcing ribs 72 extend obliquely downward from the sleeve 70 to the surface of free leg 30. The second part 58 comprises two tongues 74, which extend essentially perpendicularly from free leg 30. The tongues 74 start from the upper edge of free leg 30 and extend over a length that corresponds essentially to the distance between the two free legs 30, 32. The two tongues 74 extend parallel to one another and are spaced apart, a free space 76 thus being formed between the two tongues 74. The width of the free space 76 corresponds to the width of the central tongue 66 in FIG. 3. The width of the tongues 74 in each case corresponds to the width of the free spaces 68 in FIG. 3.

Figure 5:
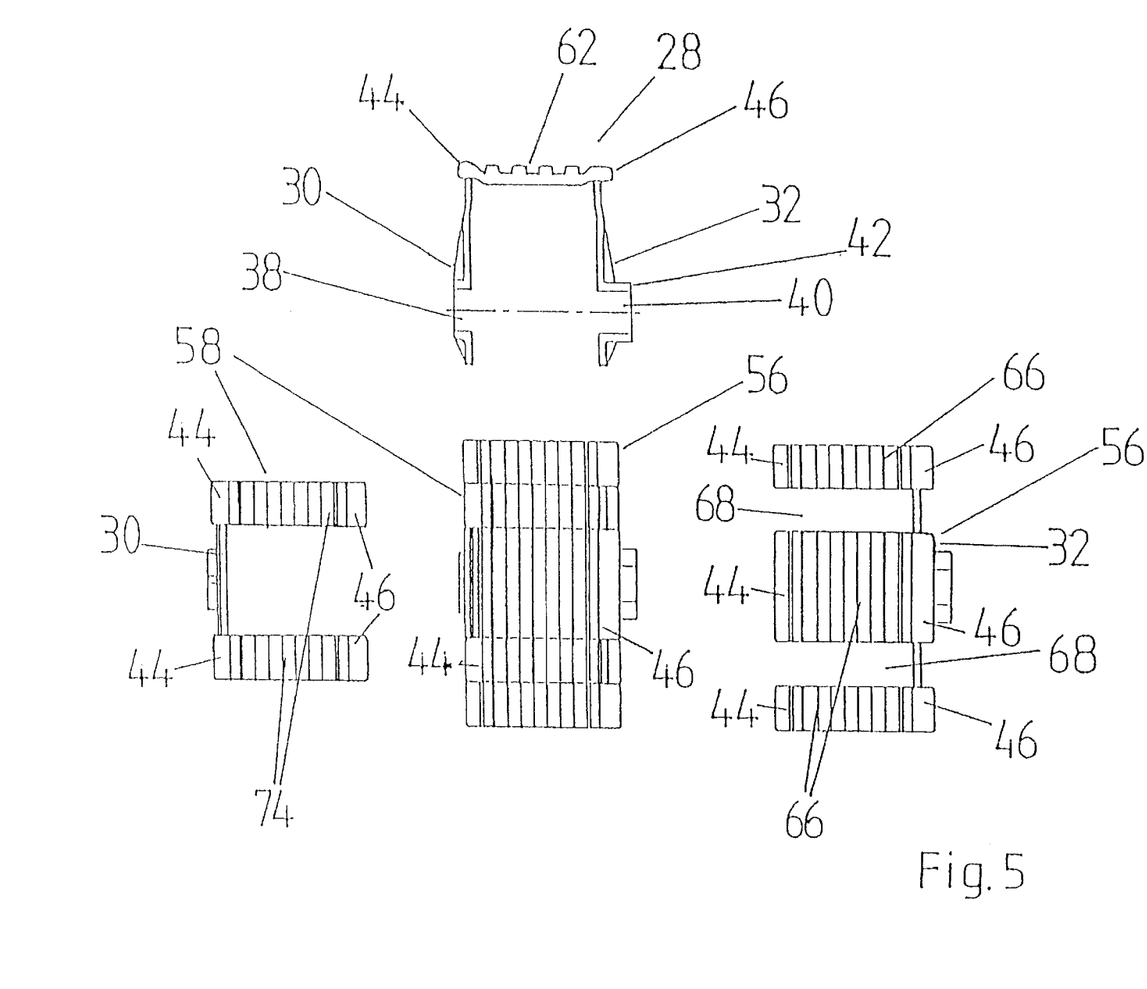
FIG. 5 shows a side view and a plan view of the assembled supporting device according to the invention.

FIG. 5 shows how the first and second parts 56, 58 of the supporting device 28 that are shown in FIGS. 3 and 4 are assembled. The overall supporting device 28 is shown in section at the top in FIG. 5. The two free legs 30, 32 are connected to one another by the base 62, giving the overall supporting device an essentially U-shaped form. The sleeve 42 with the opening 40 formed therein, which has been described above, is provided on free leg 32. Free leg 30 has the opening 38 described above. The two corners or edges at the transition from the base 62 to the free legs 30, 32 are designed as latching projections 44, 46, as described with reference to FIG. 1. The overall supporting device 28 is of two-part design, being made up of the first and second parts 56, 58, which are illustrated on the right and the left in FIG. 5 and have been described in greater detail with reference to FIGS. 3 and 4. The two parts 56, 58 are inserted one into the other in such a way that the tongues 74 of part 58 come to rest in the free spaces 68 between the tongues 66 of part 56. The front ends of the tongues 74, i.e. the ends spaced apart from free leg 30, are designed in such a way as to correspond to the latching projection 46. The rear ends of the tongues 66 of part 56, i.e. the ends facing leg 32, are likewise designed in a manner corresponding to the latching projection 46. In the assembled condition of parts 56 and 58, tongues 74 and tongues 66 thus together form the continuous latching projection 46 in the form of a continuous edge. Conversely, the free ends of the tongues 66, i.e. the sides facing away from free leg 32, are likewise designed to correspond to the latching projection 44, with the result that, in the assembled condition of parts 56 and 58, they form a continuous latching projection 44 along the edge of the base 62 together with the rear ends of the tongues 74, i.e. the ends facing leg 30, which are likewise designed to correspond to the latching projection 44.

The assembly of the drive arrangement according to the invention will now be described, once again with reference to FIG. 1. The gearwheel 34 is first of all connected to the shaft 14 and secured on the latter by means of the notched pin 36. The gearwheel 36 is then pushed into the opening 40 in leg 32 of part 56 (see FIG. 3) of the supporting device 28 with the shaft 14. Part 56 is then inserted into the cavity 18 within the supporting section 2. During this process, the sleeve 42 is fitted into the opening 16 and the latching projections 44 and 46 on the tongues 66 (see FIGS. 3 and 5) engage in the latching grooves 48 and 50 in the supporting section 2. The driving wheel and part 56 of the supporting device 28 are thus held securely in the cavity 18 within the supporting section 2. The toothed belt 52 can then be introduced into the cavity 18 through the open longitudinal side 20 of the supporting section 2. During this process, the toothed belt 52 is pushed onto the upper side of the gearwheel 34, with the result that it comes to rest between the base 62 (see FIGS. 2 and 5) of the supporting device 28 and the toothing 54 of the gearwheel 34, entering into engagement with the toothing 54. The second part 58 of the supporting device 28 is then pushed onto the first part 56 of the supporting device 28 by means of the leg 30, as explained with reference to FIG. 5. During this process, the opposite end of the shaft 14 from the conveying roller 4 enters the opening 38 in leg 30. At the same time, the second part 58 engages in the latching grooves 48 and 50 of the supporting section 2 by means of those parts of the latching projections 44 and 46 that are formed on the tongues 74, with the result that the second part 58 of the supporting device 28 too is held securely within the supporting section 2. As a departure from this embodiment, in which the second part 58 of the supporting device 28 also engages in the supporting section 2, the second part 58 can also be configured in such a way that it engages only with the first part 56 of the supporting device 28, which is in engagement with the supporting section 2. In this way, even simpler assembly is achieved since the second part 58 has only to be connected directly to one other component.

The cover strip 22 can then be engaged on the latching projections 26, with the result that the cavity 18 in the supporting section 2 is completely closed off from the outside, preventing any dirt from entering the cavity 18 and ensuring that there is no risk of injury to persons working close to the roller conveyor. The supporting section 2 is then mounted on a roller conveyor together with an opposite supporting section (not shown here) in order to accommodate conveying rollers 4. The conveying roller 4 is then mounted by means of the recess 12 in its roller end piece 8 on the square free end of the drive shaft 14 and mounted in a known, rotatably supported, manner on the other supporting section (not shown) at its other end. The result is that the drive arrangement according to invention can be mounted in the supporting section 2 in an extremely simple manner that does not require any screwing operations or other complicated assembly operations. In addition, the entire drive arrangement comprising the supporting device 28, the gearwheel 34 and the toothed belt 52 is fully enclosed hin the supporting section 2.

LIST OF REFERENCE NUMERALS

2 Supporting section
4 conveying roller
6 roller body
8 roller end piece
10 longitudinal axis of roller
12 recess
14 drive shaft
16 opening
18 cavity
20 longitudinal side
22 cover strip
24 latching groove
26 latching projection
28 supporting device
30, 32 free leg of the supporting device
34 gearwheel
36 notched pin
38 opening
40 opening
42 sleeve
44, 46 latching projections
48, 50 latching grooves
52 toothed belt
54 toothing
56 first part of the supporting device
58 second part of the supporting device
60 hole
62 base
64 reinforcing ribs
66 tongues
68 free space
70 sleeve
72 reinforcing ribs
74 tongues
76 free space

What is claimed is:

1. A drive system for a roller conveyor, comprising: at least one conveying roller; at least one supporting section for supporting the conveying roller, the supporting section having a supporting side facing the conveying roller, an open side facing away from the conveying roller and a cavity formed in the supporting section, at least one drive arrangement mounted in the cavity, the drive arrangement comprising, a shaft extending through the supporting side of the supporting section and rotationally fixed to the conveying roller, at least one driving wheel connected in a rotationally fixed manner to the shaft for driving the conveying roller and at least one substantially U-shaped supporting device having a first free leg between the supporting side and the driving wheel and a second leg between the driving wheel and the open side of the supporting section, the second leg being removable from the first leg at the open side of the supporting section, the first and second legs having bearings for the shaft.

2. The drive system as claimed in claim 1, further comprising a common driving means for driving the at least one driving wheel.

3. The drive system as claimed in claim 2, in which the driving wheel is a gear wheel, and wherein the common driving means is a toothed belt or a chain.

4. The drive system as claimed in claim 1, in which the supporting device is secured within the cavity of the supporting section by beihg latched in.

5. The drive system as claimed in claim 1, in which the first and second legs of the supporting device are connected to the supporting section independently by being latched in.

6. The drive system as claimed in claim 5, in which the supporting device forms a guide for the driving means.

7. The drive system as claimed in claim 6, in which the driving wheel and the supporting device are manufactured from plastic.

8. The drive system as claimed in claim 1, in which the supporting section further comprising a cover strip removably mounted to the supporting section for closing the open side of the supporting section.

9. The drive system as claimed in any of claims 1 to 8, in which the driving wheels (34) and/or the supporting devices (28) are manufactured from plastic.

10. The drive system as claimed in any of the preceding claims, in which the supporting section (2) is of open construction on one longitudinal side, preferably on the longitudinal side (20) facing away from the conveying rollers (4), to enable the drive arrangements (14, 34, 52) to be inserted, this area of open construction preferably being closable by means of a cover strip (22).

* * * * *